United States Patent
Baker (10) Patent No.: US 9,211,572 B2
(45) Date of Patent: Dec. 15, 2015

(54) SYSTEM AND METHOD FOR SANITIZING PNEUMATIC CONVEYING PIPING

(71) Applicant: Todd Baker, Parkville, MO (US)

(72) Inventor: Todd Baker, Parkville, MO (US)

(73) Assignee: Horizon Systems, Inc., Lawrence, KS (US)

( * ) Notice: Subject to any disclaimer, the term of this patent is extended or adjusted under 35 U.S.C. 154(b) by 0 days.

(21) Appl. No.: 13/785,087

(22) Filed: Mar. 5, 2013

(65) Prior Publication Data

US 2014/0251376 A1 Sep. 11, 2014

(51) Int. Cl.
| | |
|---|---|
| *B08B 9/043* | (2006.01) |
| *B08B 9/053* | (2006.01) |
| *B08B 9/055* | (2006.01) |
| *B65G 45/00* | (2006.01) |
| *B65G 53/52* | (2006.01) |
| *F16L 55/46* | (2006.01) |
| *B08B 9/00* | (2006.01) |

(52) U.S. Cl.
CPC ............... *B08B 9/0433* (2013.01); *B08B 9/053* (2013.01); *B08B 9/0535* (2013.01); *B65G 53/521* (2013.01); *F16L 55/46* (2013.01); *B65G 45/00* (2013.01)

(58) Field of Classification Search
USPC ...................................................... 15/104.061
See application file for complete search history.

(56) References Cited

U.S. PATENT DOCUMENTS

| | | |
|---|---|---|
| 3,480,984 A | 12/1969 | Kidd |
| 4,141,753 A | 2/1979 | Creed |
| 4,653,134 A | 3/1987 | Ando |
| 4,718,142 A | 1/1988 | Wahlers |
| 4,774,905 A | 10/1988 | Nobis |
| 5,086,842 A | 2/1992 | Cholet |
| 5,442,826 A | 8/1995 | Murata et al. |
| 5,535,473 A * | 7/1996 | Maniar ....................... 15/104.33 |
| 5,795,402 A | 8/1998 | Hargett, Sr. et al. |
| 5,951,761 A | 9/1999 | Edstrom |
| 6,067,682 A * | 5/2000 | Rankin ..................... 15/104.061 |
| 6,168,671 B1 * | 1/2001 | Peterson et al. .................. 134/6 |
| 6,263,534 B1 | 7/2001 | McCann et al. |
| 6,305,409 B1 * | 10/2001 | Furness .................... 137/355.16 |
| 6,500,271 B1 | 12/2002 | Moore et al. |

(Continued)

FOREIGN PATENT DOCUMENTS

DE 10151553 4/2003

*Primary Examiner* — Nicole Blan
*Assistant Examiner* — Pradhuman Parihar
(74) *Attorney, Agent, or Firm* — Kutak Rock LLP; Bryan P. Stanley (57) ABSTRACT

A system and method for sanitizing pneumatic conveying piping is provided. The system includes a motorized hose reel with a pig attached to the end of the hose. The pig is smaller in diameter than the inner diameter of the pipe through which it is conveyed. The decreased size of the pig keeps the conveying speed of the pig through the pipes down, while at the same time providing sufficient force to pull the supply hose attached to the pig through the pipes with the pig. The pig of some embodiments of the inventive concept is shaped as a hollow cone or frustoconical shape. Such a shape reduces weight of the pig and also allows the hose to be inserted through the body of the pig with a spray nozzle at the end. The hollow cone shape deflects relatively easily to allow the pig to go around corners or other obstructions. Also, such a pig design automatically centers the nozzle within the pipe during spraying. The pig of some embodiments is further made of a urethane material that is easily washable and non-porous to maximize sanitary conditions.

11 Claims, 3 Drawing Sheets

(56) References Cited

U.S. PATENT DOCUMENTS

| | | |
|---|---|---|
| 6,527,869 B1 * | 3/2003 | Bourg .................... 134/1 |
| 6,651,744 B1 | 11/2003 | Crawford |
| 6,655,393 B2 | 12/2003 | Loughmiller |
| 6,874,193 B2 | 4/2005 | Pruett |
| 7,044,226 B2 | 5/2006 | Stave |
| 7,121,347 B2 * | 10/2006 | Murray et al. .................. 166/372 |
| 7,181,985 B2 | 2/2007 | MacMillan et al. |
| 7,354,483 B2 | 4/2008 | Farris |
| 7,827,646 B2 | 11/2010 | Pruett |
| 2007/0269269 A1 * | 11/2007 | Coronado et al. ............. 405/158 |
| 2010/0139019 A1 | 6/2010 | Geppert et al. |
| 2010/0186967 A1 * | 7/2010 | Xu et al. ...................... 166/373 |
| 2012/0097192 A1 | 4/2012 | Crawford et al. |

* cited by examiner

SYSTEM AND METHOD FOR SANITIZING PNEUMATIC CONVEYING PIPING

FIELD

The present inventive concept relates generally to the field of pneumatic conveying systems used to transport particulate material. Particularly, the inventive concept relates to a system and method for sanitizing pneumatic conveying piping.

BACKGROUND

Pneumatic conveying systems are used to transport large quantities of particulate material through pipes. Examples of particulate material include powders, granules, pellets, seeds, beans, nuts, pasta, pet foods, snack foods, and other similar items. In a common pneumatic conveying system, a fluid, usually air, is blown through the pipes. The air enters the pipes through a filtered air inlet. The particulate material enters the pipes through a material inlet. The air is mixed with the particulate material and together, the air and particulate material moves through the pipes. Both the air and the particulate material exit the pipes through an outlet.

Dilute phase conveying occurs when the particulate material is transported at a relatively high velocity (i.e., above the saltation point). Particles are suspended in the air stream generated by a low pressure blower to move at approximately the same velocity as the air stream. This results in a relatively low product to air ratio (i.e., less than 15:1). This also results in high particle-to-particle and particle-to-pipe interaction. Dilute phase conveying is particularly useful for conveying dry materials such as flour, in which particle shear and breakdown from high particle-to-particle and particle-to-pipe interaction is less common and/or less objectionable.

Dense phase conveying occurs when the particulate material is transported at a relatively low velocity (i.e., well below the saltation point). A positive displacement blower is located upstream from the particulate material inlet. The positive displacement blower increases fluid (air) pressure within the pipes downstream of the positive displacement blower. Because the particles are not suspended in the fluid (air), they drop to the bottom of the pipe. The pressure from the positive displacement blower pushes the particles together into lumps or "slugs" within the pipe. The slugs of material are transported through the pipe with a pocket of fluid (air) between each slug. Dense phase conveying usually achieves a higher product to air ratio than dilute phase conveying. The lower velocities also result in lower particle-to-particle and particle-to-pipe interaction.

Regardless of whether dilute phase or dense phase conveying is utilized, it is often desirable and/or necessary to clean and sanitize the interior of the pipes through which product is conveyed. For example, when the material being conveyed is a food product (whether for human or pet consumption) that is highly susceptible to contamination by bacteria or other contaminants, it is often necessary to sanitize the interior of the pipes. In some cases contaminated product will unknowingly be conveyed through a system (such a pet food contaminated with salmonella), and when such contamination is discovered, the entire system must be brought offline and sanitized before it can be used for conveying any other materials. Because of the size and nature of these conveying systems, they generally are designed as clean-in-place (CIP) systems, meaning that the conveying lines (pipes) are cleaned and/or sanitized on site and any cleaning/sanitizing equipment is permanently located at and/or transported to the location of the conveying lines.

A number of systems and methods currently exist for cleaning conveying lines, such as the use of line pigs, dry ice or a material flush. For one example, in dilute phase conveying systems in particular, pipeline "pigs" are often utilized to clean deposits from the interior walls of the conveying lines. Pigging is accomplished by inserting the pig (in some cases into a "pig launcher" or "launching station"—e.g. a funnel shaped Y section in the pipeline), closing/sealing the launching station, and activating the blower to cause the pig to flow through the pipeline until it reaches the receiving bin/station (or "pig catcher") at the end of the conveying lines. The pig is then manually removed from the receiving bin by an operator that accesses the interior of the bin. A conventional cleaning "pig" comprises a generally short length of material (typically shaped as a ball or cylinder) that spans the inner diameter of the pipe it is designed to clean, such that the exterior of the pig engages the interior walls of the pipe to remove material deposits from those walls as it travels through the conveying lines. Typically, a pig's diameter is at least as large as, and often larger than the diameter of the pipe it is going to clean so that the exterior of the pig is in continuous contact with the inner walls of the pipe. Various pig designs include exterior brushes, fluid ejecting nozzles, and other features to aid in cleaning the walls of the pipe.

Once the lines are cleaned, several conventional systems have been utilized for sanitizing the cleaned lines. One option is a full wet CIP loop, in which a large amount of sanitizing solution is pumped through the conveying lines, which are generally operated as a closed-loop system. Full wet CIP systems require usage of a very high volume of cleaning fluid, as well as complicated, specially designed pumps, fluid tanks, return piping (e.g. to create the loop), etc. to sanitize conveying lines. Proper disposal of the used sanitizing fluid is often an issue, particularly as environmental regulations increase. In addition, due to the large amount of wet residue remaining of the sanitizing fluid, the conveying lines must remain offline for extended periods of time until they are allowed to dry out. As such, full wet CIP systems are often not practical for use in sanitizing conveying lines in which primarily dry product is transported.

Another option for sanitizing already cleaned conveying lines utilizes sanitizing pigs that are similar to those utilized for cleaning conveying lines. These sanitizing pigs are typically constructed of a porous material such as a foam/sponge material that is capable of soaking up the sanitizing solution. The pigs are "loaded" with sanitizing solution and then conveyed through the pipes in the same manner discussed above with respect to cleaning pigs. The sanitizing solution is then spread onto the inner walls of the pipes through direct contact with the exterior surfaces of the pigs. Such methods result in uneven application of sanitizing solution, as more solution will be applied early on when the pig is more heavily soaked, and decrease as the pig travels through the pipes. In addition, due to the materials used to make sanitizing pigs capable of soaking up fluid, such pigs are not compatible with a number of sanitizing solutions, which would destroy the pig material. Moreover, it is necessary for an operator to access the interior of the receiving bin to remove the pigs after they are conveyed through the pipes.

Another option for sanitizing already cleaned conveying lines utilizes a high pressure wet "snake" that includes a special spray nozzle attached to the end of a supply line. In such systems, a large volume of fluid is pumped out the nozzle to propel the snake and supply line through the pipe. Thus, such systems leave a large amount of wet residue behind, creating the same or similar disposal and drying time difficulties discussed above with respect to full wet system.

Other options for sanitizing already cleaned conveying lines often utilize line pigs attached to a tether to pull a spray rig through the conveying lines. The pig is conveyed through the pipes and retrieved at the receiving bin by an operator. The spray rig is then pulled through the lines using the tether. The spray rig is then pulled back out of the conveying lines, spraying sanitizer as it is retracted. One exemplary system is the BioMist system, which utilizes an alcohol based sanitizing solution, and requires compressed carbon dioxide for atomization of the solution. The alcohol based sanitizing solution of the BioMist system is often undesirable due to the potential for vapor build up in enclosed system to potentially explosive levels. Moreover, these type of systems are very time consuming, require operators to access both the launch side and receiving side of the system, and expose operators to the interior of the system to retrieve the pig and tether lines.

Other systems utilize spray rigs that are incorporated into or attached to a pig device and propelled through the conveying lines with the pig by the blower for the pipeline. Refraction of the spray rigs is often difficult because the pig tends to get stuck in the pipeline. Thus, such systems often require removal of the pig from the spray rig prior to retraction of the rig from the pipeline. This requires the operator to access the interior of the conveying system as the receiving bin. Moreover, in many dilute phase conveying systems, the high velocity of travel of the pig through the pipes can result in damage to the spray nozzle.

Therefore, it would be beneficial to provide a system and method for sanitizing pneumatic conveying lines that overcome the deficiencies of the prior art discussed above.

SUMMARY

Objects of the present inventive concept include, but are not necessarily limited to, providing a system and method for sanitizing pneumatic conveying lines that is easy to use, utilizes a relatively low volume of sanitizing solution, can be easily retrofitted into existing systems, and/or allows for repeatability of sanitization results.

The system of the inventive concept is utilized in connection with a pneumatic conveying system that includes a particulate material insertion assembly, sometimes referred to as an airlock and pick up shoe, configured to insert particulate material into a conveyance line or pipe. A blower is located upstream from the particulate material insertion assembly. In one embodiment, the blower is a low pressure blower of a dilute phase conveying system. The blower feeds transport fluid through the conveyance line. As the blower feeds transport fluid through the conveyance line, pressure downstream from the blower is increased and the transport fluid is mixed with the particulate material.

The system of the inventive concept includes a motorized hose reel with a pig attached to the end of the hose. The pig of the inventive concept is smaller in diameter than the inner diameter of the pipe through which it is conveyed. In some embodiments the pig is at least one inch smaller in diameter than the inner diameter of the pipe. In other embodiments the pig is generally about twenty-five percent (25%) smaller than the inner diameter of the pipe through which it is designed to be conveyed. The decreased size of the pig keeps the conveying speed of the pig through the pipes down, while at the same time providing sufficient force to pull the supply hose attached to the pig through the pipes with the pig. The pig of some embodiments of the inventive concept is shaped as a hollow cone or frustoconical shape. Such a shape reduces weight of the pig and also allows the hose to be inserted through the body of the pig with a spray nozzle at the end. The hollow cone shape deflects relatively easily to allow the pig to go around corners or other obstructions. Also, such a pig design automatically centers the nozzle within the pipe during spraying. The pig of some embodiments is further made of a urethane material that is easily washable and non-porous to maximize sanitary conditions.

In some embodiments, a Y pipe pig-launching station is added to the conveying line to allow for easy insertion of the pig into the conveying lines. In some embodiments the Y pipe is permanently attached to the conveying lines. In other embodiments, the particulate material insertion assembly is removed and replaced with the Y pipe during cleaning/sanitizing procedures. In some embodiments in which the Y pipe pig launching station is permanently attached to the conveying lines, the Y section of the pipe is located between the particulate material insertion assembly and the blower so that the entire length of conveying lines in which contaminated materials might enter and contact the inner walls of the conveying lines is accessible by the sanitizing system of the inventive concept. The pig is inserted while or before the air is blowing through the pipe and the air carries the pig and nozzle through the pipe, unreeling the supply hose as it travels through the pipe. When the pig reaches the end of the pipe, the blower is turned off. A pump on the inventive system is then turned on to start pumping sanitizer through the supply hose and out the nozzle at the pig. A motor is engaged to turn the reel and retract the hose from the pipe so that sanitizer is sprayed through the pipe as the hose/pig is retracted.

In some embodiments a speed sensor is added to the system to monitor the speed of retraction of the pig from the pipe. This allows for a more even and repeatable application of sanitizer throughout the conveying lines. In some such embodiments, a flow meter is also added to the system to monitor the volume of sanitizer fluid sprayed over a given amount of time. In some embodiments, the speed sensor and flow meter are inputs to computer control system for the system of the inventive concept. The computer control system acquires data from the speed sensor and flow meter and controls the pump and the motor. The control system can vary to speed of the pump and/or motor to control the amount of sanitizer sprayed over a given length of pipe. In some embodiments, the desired amount of sanitizer over a given surface area or given length of pipe can be set into the control system, along with certain parameters regarding the conveying lines (such as inner diameter of the line), and the control system automatically calculates the retraction speed and pump flow, and controls the same, to provide the desired amount of sanitizer. In other embodiments, the operator can manually adjust retraction speed and/or pump flow rate through inputs in the control system.

The system of the inventive concept is easy to use. In most embodiments, a single operator can accomplish the sanitization of conveying lines using the system. Access to the conveying lines is only required at the inlet of the system. There is no need for an operator to enter the receiving bin to retrieve pigs or other assemblies, and thus no exposure of the operator to potentially contaminated environment and/or other risks of injury. The blower for the conveying air system pulls/pushes the pig/spray nozzle through the conveying lines. In some embodiments, a special pig launching fitting allows the supply hose to feed into the system as the pig is pushed down the line, while simultaneously minimizing loss of pressure within the conveying lines. In some embodiments, a powered retraction system is provided to increase ease of use by the operator. In addition the system of the inventive concept also can be used on different conveying systems with different line sizes.

Thus, only a single system can be utilized in a location that includes multiple different conveying systems.

The system of the inventive concept allows a low volume of solution to be used. In some embodiments, a 360 degree nozzle wets the full interior surface of the lines through which it is conveyed and then retracted. Only a small amount of residue is left in the conveying line, which can be dried out quickly by running the conveying blower.

The system of the inventive concept can be easily retrofitted into existing systems. No major equipment additions are needed and no additional piping (such as return lines) is needed.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The inventive concept relates to a system and method for sanitizing pneumatic conveying lines. It will be appreciated that although the embodiments of the system of the inventive concept described herein are particularly useful for sanitizing conveying lines in dilute phase conveying systems, some embodiments will likewise be utilized for sanitizing conveying lines of dense phase conveying systems, or of any other type of conveying systems, without departing from the spirit and scope of the inventive concept.

The system of some embodiments of the inventive concept is utilized in a pneumatic conveying system that includes a particulate material insertion assembly, also known as an airlock or hopper. The insertion assembly is configured to insert particulate material into the conveyance line or pipe. The particulate material is stored at ambient atmospheric pressure. It preferably includes an airlock to transfer the particulate material into the pressurized or vacuum conveyance line. The insertion assembly minimizes, but does not eliminate, fluid leakage.

A low pressure blower or vacuum pump is located upstream from the particulate material insertion assembly. The blower feeds transport fluid through the conveyance line. Preferably, the blower operates at a constant rpm while the particulate material is being inserted into the conveyance lines. An increase in pressure is created in the conveyance line downstream from the blower outlet. By way of example, the transport fluid may be atmospheric air, a compressed inert gas, or any other suitable transport fluid. In the event that the transfer fluid is atmospheric air, the supply of transfer fluid may be the ambient atmosphere. In the event that the transfer fluid is a compressed inert gas, the supply of transfer fluid may be an enclosed reservoir (tank) of compressed inert gas.

Figure 1:
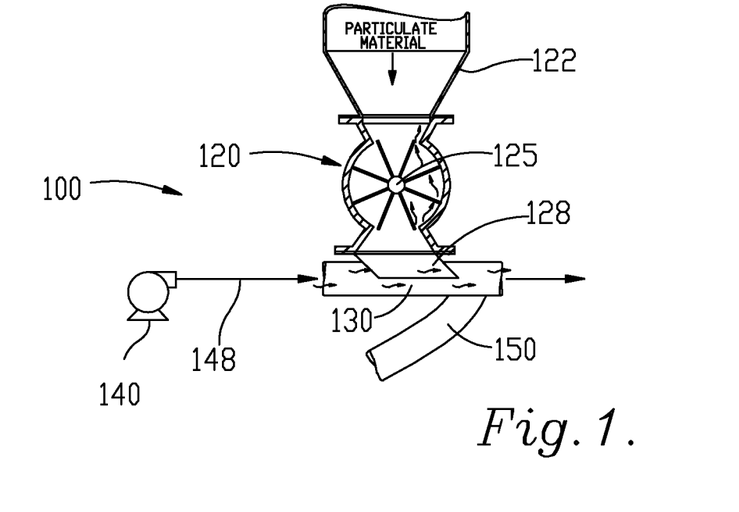
FIG. 1 shows an exemplary embodiment of a particulate material dilute phase pneumatic conveying system.

Referring to the figures, an exemplary embodiment of a particulate material dilute phase pneumatic conveying system 100 is shown in FIG. 1. As shown in FIG. 1, a particulate material insertion assembly 120 inserts particulate material into the conveyance line 130. The insertion assembly 120 includes a supply of particulate material stored in a particulate material storage vessel 122. The insertion assembly 120 includes a multi-vane rotor 125 airlock that meters, somewhat, the insertion of particulate material into the conveyance line 130 and minimizes leakage of transport fluid out of the conveyance line 130. The particulate material is inserted into the conveyance line 130 via a pick up shoe 128. The pick up shoe 128 allows a predetermined volume of particulate material to accumulate before being inserted into the conveyance line 130. Preferably, the pick up shoe 128 includes a cross-sectional diameter that is smaller than the cross-sectional diameter of the conveyance line 130. The particulate material stored in the storage vessel 122 is stored at ambient atmospheric pressure.

The system of FIG. 1 also includes a low pressure blower 140 upstream from the insertion assembly 120. The blower 140 includes an inlet and an outlet (indicated by the out arrow). The blower transfers transport fluid from the inlet to the outlet and through the conveyance line 130. In FIG. 1, the pressure side 148 of the blower is located downstream from the blower. In FIG. 1, the transport fluid is ambient air. The supply of ambient air is the local atmosphere.

Figure 2:
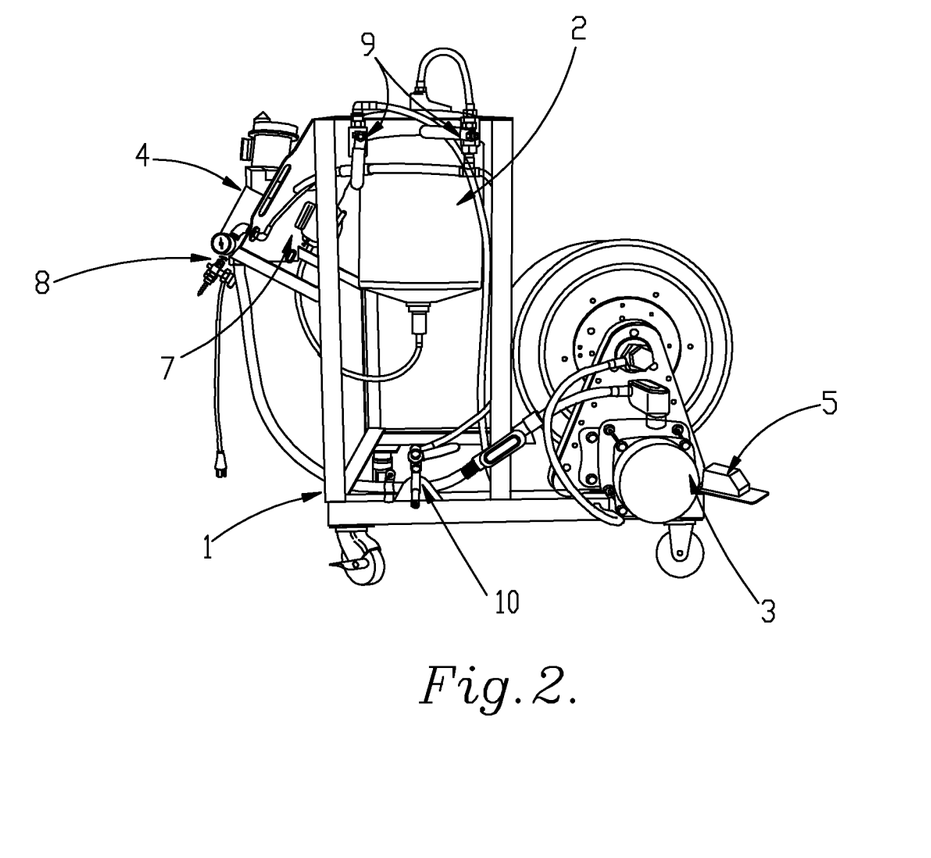
FIG. 2 shows a front perspective view of a mobile skid including a sanitizing system of an embodiment of the inventive concept.
Figure 3:
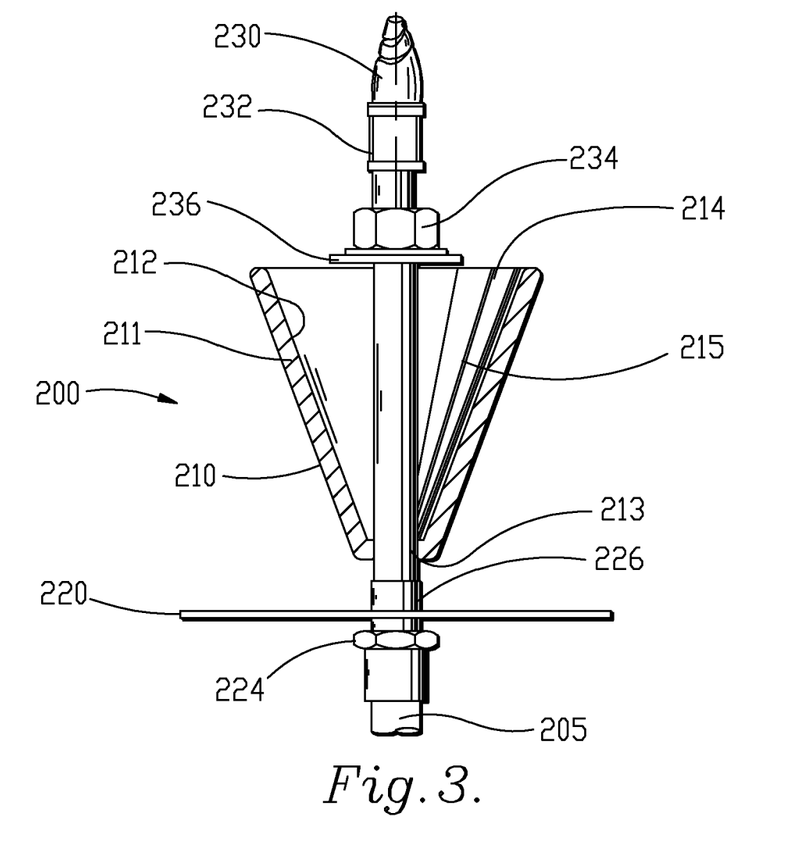
FIG. 3 shows an exploded sectional view of an embodiment of a pig and spray nozzle assembly for the sanitizing system of FIG. 2.

Referring to FIGS. 2 and 3, the system of the inventive concept includes a motorized hose reel with a pig attached to the end of the hose. In the embodiment shown in FIG. 2, the system of the inventive concept comprises a mobile skid that includes a frame 1 with casters, allowing the sanitization system to be easily moved between multiple conveying systems and/or stored when not in use. A mix tank 2 with a lid and recirculation connection is mounted to the frame 1. The mix tank stores and/or mixes the sanitizer fluid used by the system of the inventive concept. A hose reel 3 with a 120 volt motor to rotate the reel is also mounted to the frame 1. A ⅜ inch supply hose 205 is reeled up onto the hose reel 3 with one end in fluid communication (either through a direct connection, or connected via additional fittings, connection lines) with an air operated diaphragm pump 7 that is connected via a supply hose to the mix tank 2. The other end of the supply line is connected to pig and spray nozzle assembly 200. The speed in which the motor for reel 3 rotates is controlled by a hose reel motor speed control input 4 that is mounted to the frame at a height that allows for easy access and use by a standing operator. Foot switch 5 is operably connected to the motor of reel 3 to allow the operator to turn on/off the motor to quickly and easily start and/or stop retraction of the supply hose 205. The foot switch connection allows the switch to be placed on the ground near the skid to allow for easy control by the operator.

The pump 7 includes a compressed air regulator and on/off ball valve 8 for connecting a compressed air source to start and run the pump 7. In the embodiment shown, the compressed air source is not included on the skid shown in FIG. 3. Nevertheless, it will be appreciated that the compressed air source, such as an air compressor, is included on the skid to provide a fully self-contained unit. Furthermore, it will be appreciated that in alternative embodiments other types of pumps are utilized, including pumps that do not require priming, such as a self-priming centrifugal pump.

Ball valves 9 are connected to supply lines between the pump 7, mix tank 2 and supply line 205. The ball valves are opened and/or closed to switch between recirculation for mixing the sanitizing fluid within mix tank 2, and spraying modes. Another ball valve 10 is included for draining/cleaning out the hoses and mix tank in the system.

The pig 210 of the inventive concept is smaller in diameter than the inner diameter of the pipe through which it is conveyed. In some embodiments the pig is at least one inch smaller in diameter than the inner diameter of the pipe. In other embodiments the pig is generally about twenty-five percent (25%) smaller than the inner diameter of the pipe through which it is designed to be conveyed. The decreased size of the pig keeps the conveying speed of the pig through the pipes down, while at the same time providing sufficient force to pull the supply hose attached to the pig through the pipes with the pig. The pig 210 of the embodiment shown in FIG. 3 is shaped as a hollow cone or frustoconical shape. Such a shape reduces weight of the pig and also allows the hose 205 to be inserted through the hollow body 215 of the pig with a spray nozzle 230 at the end. The hollow cone shape deflects relatively easily to allow the pig to go around corners or other obstructions. Also, such a pig design automatically centers the nozzle within the pipe during spraying. The pig of some embodiments is further made of a urethane material that is easily washable, impermeable and non-porous to maximize sanitary conditions.

The pig 210 shown in FIG. 3 includes outer wall 211 and inner wall 212 spaced generally in parallel with outer wall 211 forming a hollow cavity 215 within the body of pig 210. The rear end of pig 210 includes opening 213 to allow supply hose 205 to be inserted through the hollow body 215 of pig 210. A larger opening 214 is located at the opposing front end of pig 210. Spray nozzle 230 extends outward from the front opening 214.

Figure 4:
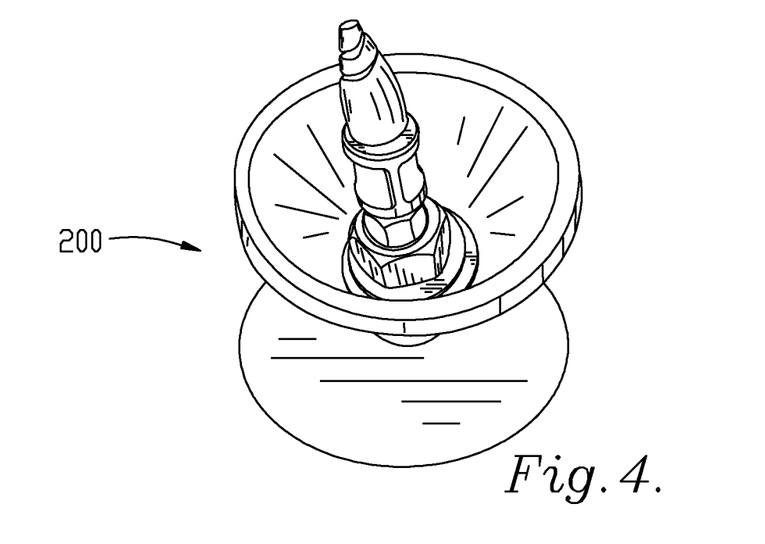
FIG. 4 shows a top perspective view of the pig and spray nozzle assembly of FIG. 3.
Figure 5:
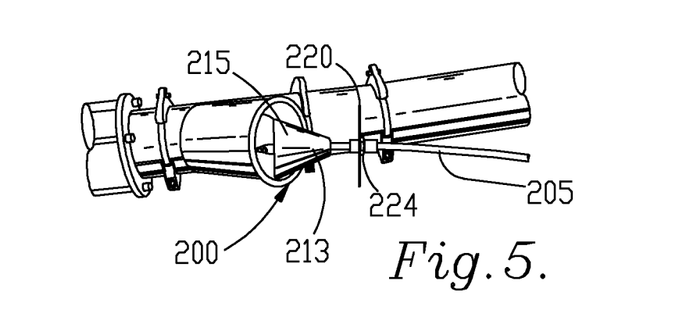
FIG. 5 shows a side view of the pig and spray nozzle assembly of FIG. 3 being inserted into a Y pipe pig launching station of the pneumatic conveying system of FIG. 1.
Figure 6:
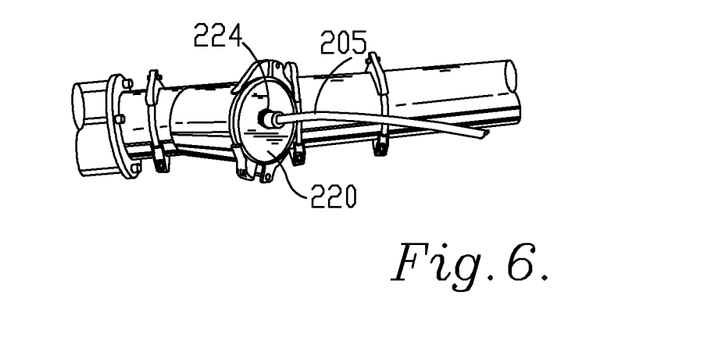
FIG. 6 shows the pig and spray nozzle assembly fully assembly with the pneumatic conveying system of FIG. 1.

The pig and spray assembly is attached to sanitizer supply line 205 by first inserting the end of supply line 205 through the pig launcher plate 220 which includes outer grommet 224 and inner grommet 226 connected thereto for providing an air seal with supply line 205 for minimizing pressure loss within conveying lines to which the assembly is connected, while also allowing the supply line 205 to easily unspool from hose reel 3. The end of the hose is then inserted through the small opening 213 at the rear end of the pig 210, and flat washer 236 and then spacer nut 234 or inserted over the hose and seated into the bottom of the interior cavity 215 of the cone-shaped pig. Nozzle 230 is then pushed onto the end of hose 205 and ferrule 232 of nozzle 230 is pulled back and the hose is fully seated into the fitting. The nozzle fitting is then pushed back toward the rear side of the cone so that the push to connect ferrule ring is inside the inner diameter of the spacer nut. The spacer nut prevents the ferrule from being triggered when it is pulled on (i.e. when the hose is being retracted). Once the nozzle is assembled (see FIG. 4), the entire assembly is inserted into a pig launcher with the larger cross-sectional end of the cone/frustoconical shape facing forward (i.e. facing the direction of conveyance such the larger end is the front of the pig during conveyance through the pig by the blower) (see FIG. 5) and plate 220 is attached with a clamp to the opening of the pig launcher (see FIG. 6).

In some embodiments, a Y pipe pig-launching station is added to the conveying line to allow for easy insertion of the pig into the conveying lines. In the embodiment shown in FIG. 1 the Y pipe is permanently attached to the conveying lines. In other embodiments, the particulate material insertion assembly is removed and replaced with the Y pipe during cleaning/sanitizing procedures. In the embodiment shown in FIG. 1, the Y section 150 of the pipe is located near the outlet of the particulate material insertion assembly 120, opposite the side of the material insertion assembly 120 that receives transport fluid from the outlet of the blower 140, so that generally the entire length of conveying lines in which contaminated materials might enter and contact the inner walls of the conveying lines is accessible by the sanitizing system of the inventive concept. The pig is inserted into the launcher as described above and the plate 220 is clamped in position. Typically, prior to insertion into the pig launcher, the pump is primed until sanitizer flows out nozzle 230. Once the pig is inserted, the blower is started and the reel is allowed to freewheel and allow the supply hose 205 to unspool from the reel. As the air is blowing through the pipe, it carries the pig and nozzle through the pipe, unreeling the supply hose as it travels through the pipe. When the pig reaches the end of the pipe, the blower is turned off. The pump is then turned on to start pumping sanitizer through the supply hose and out the nozzle at the pig. The foot switch is then used to activate the motor to turn the reel and retract the hose from the pipe so that sanitizer is sprayed through the pipe as the hose/pig is retracted.

In the embodiment shown in FIGS. 2 and 3, the sanitizing system of the instant invention is utilized by first moving the mobile rolling skid reel into position near the entry point into the convey line (e.g. to the pig launching station Y pipe 150 in FIG. 1). The pig, nozzle, spacers and launcher entry plate are assembled in the manner discussed above. The desired sanitizer chemical is added to the mix tank. If mixing is necessary, the reel supply ball valve is turned off and the recirculation valve is turned on. Then the operator should verify that the compressed air supply ball valve is off and connect compressed air to the supply connection. Next, the compressed air supply ball valve is turned on to start and run the diaphragm pump. The air supply ball valve is then turned off when mixing is complete, and the recirculation ball valve is closed and the hose reel ball valve is opened. If the hose has not been primed, the end of the ⅜" hose is placed into the tank and the compressed air supply ball valve is turned on. The pump is then run until the chemical comes out of the nozzle in a continuous spray. The compressed air supply valve is then turned off. The pig and nozzle assembly are placed into the pig launcher connection as discussed above. The system convey blower is turned on and the sanitizer supply hose is fed through the grommet in the launcher plate until the pig reaches the far end of the system. The system convey blower is turned off. The hose reel motor speed control is plugged into a 120 volt extension cord. The foot switch is positioned where it is easily accessible to the operator. The compressed air supply valve is turned on. The footswitch is depressed to start the motor to reel up the sanitizer supply hose and the hose is guided by the operator onto the reel as it is refracted back to the reel.

If the hose become very taught and there is an obvious higher load on the reel motor, the operator will release the footswitch and stop retraction of the hose to prevent over stretching and potential damage to the hose. At the same time the operator will turn off the compressed air ball valve to stop the flow/spraying of sanitizer fluid. The operator will allow the tension in the hose to release. Then the ball valve is opened again and the foot switch is depressed to retract the hose again while spraying sanitizer. This sequence may need to be repeated multiple times to get past the jam. In severe cases, the convey blower may need to be restarted to blow the pig back down the line slightly so that the pig realigns to get past the block.

The operator will stop the reel by releasing the foot switch when the pig returns to the pig launcher area. Then the pig assembly is removed from the launcher.

In some embodiments a speed sensor is added to the system to monitor the speed of retraction of the pig from the pipe. This allows for a more even and repeatable application of sanitizer throughout the conveying lines. In some such embodiments, a flow meter is also added to the system to monitor the volume of sanitizer fluid sprayed over a given amount of time. In some embodiments, the speed sensor and flow meter are inputs to computer control system for the system of the inventive concept. The computer control system acquires data from the speed sensor and flow meter and controls the pump and the motor. The control system can vary to speed of the pump and/or motor to control the amount of sanitizer sprayed over a given length of pipe. In some embodiments, the desired amount of sanitizer over a given surface area or given length of pipe can be set into the control system, along with certain parameters regarding the conveying lines (such as inner diameter of the line), and the control system automatically calculates the retraction speed and pump flow, and controls the same, to provide the desired amount of sanitizer. In other embodiments, the operator can manually adjust retraction speed and/or pump flow rate through inputs in the control system.

The system of the inventive concept is easy to use. In most embodiments, a single operator can accomplish the sanitization of conveying lines using the system. Access to the conveying lines is only required at the inlet of the system. There is no need for an operator to enter the receiving bin to retrieve pigs or other assemblies, and thus no exposure of the operator to potentially contaminated environment and/or other risks of injury. The blower for the conveying air system pulls/pushes the pig/spray nozzle through the conveying lines. In some embodiments, a special pig launching fitting allows the supply hose to feed into the system as the pig is pushed down the line, while simultaneously minimizing loss of pressure within the conveying lines. In some embodiments, a powered retraction system is provided to increase ease of use by the operator. In addition the system of the inventive concept also can be used on different conveying systems with different line sizes. Thus, only a single system can be utilized in a location that includes multiple different conveying systems.

The system of the inventive concept allows a low volume of solution to be used. In some embodiments, a 360 degree nozzle wets the full interior surface of the lines through which it is conveyed and then retracted. Only a small amount of residue is left in the conveying line, which can be dried out quickly by running the conveying blower.

The system of the inventive concept can be easily retrofitted into existing systems. No major equipment additions are needed and no additional piping (such as return lines) is needed.

The system of the embodiments discussed above is designed to accomplish the step of sanitizing conveying lines. Nevertheless, it will be appreciated that other embodiments will also accomplish the step of cleaning conveying lines as well as sanitizing. The system of the inventive concept discussed above applies a low volume spray of a sanitizing agent to the interior of the cleaned conveying line. It will be appreciated that any low viscosity pumpable solution may be utilized in combination with the system of the inventive concept, including, but not necessarily limited to: ACS/Phresh (Acidified Calcium Sulfate); Quaternary (Quat) Sanitizing Agent; Alcohol based solutions (although such solutions are often less desirably due to possible safety hazards from vapors); and any other agents that are customer/operator recognized/ approved.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration is by way of example, and the scope of the inventions is not limited to the exact details shown or described.

Although the foregoing detailed description has been described by reference to an exemplary embodiment, and the best mode contemplated for carrying out the present inventive concept has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A system for sanitizing a conveyance line of a pneumatic conveying system comprising:
   a conveyance line having a diameter;
   a tank for holding sanitizer fluid;
   a supply hose including a first end that is in fluid communication with said tank; a spray nozzle connected to a second end of said supply hose;
   a hose reel upon which said supply hose is wound and unwound;
   a line pig attached to said second end of said supply hose and associated with said spray nozzle; and
   a pump for pumping sanitizer fluid through said supply hose from said tank to said spray nozzle;
   wherein said line pig is generally twenty-five percent smaller in diameter than the diameter of the conveyance line.

2. The system as claimed in claim 1 wherein said line pig comprises a frustoconical shape such that said line bid defines a plurality of circular cross-sections of various size, the largest circular cross section being defined by a front end of the pig.

3. The system as claimed in claim 2 wherein said supply hose extends through an opening at a smaller end of said frustoconical shaped line pig and toward a bigger end of said frustoconical shaped line pig to said second end of said supply hose and said spray nozzle.

4. The system as claimed in claim 1 wherein said tank functions as a mixing tank for sanitizer fluid.

5. The system as claimed in claim 4 further comprising ball valves for switching said tank between a recirculation/mixing mode and a spray mode.

6. The system as claimed in claim 1 further comprising a motor for driving said hose reel to wind up said supply hose on said hose reel.

7. The system as claimed in claim 6 further comprising a foot switch for controlling said motor.

8. The system as claimed in claim 1 further comprising a pig launcher plate associated with said line pig, wherein said supply hose extends through an opening of said plate toward said line pig, said second end of said supply hose and said spray nozzle.

9. The system as claimed in claim 1 wherein said line pig comprises a urethane material.

10. The system as claimed in claim 1 wherein said line pig consists essentially of a generally nonporous material.

11. The system as claimed in claim 1 wherein said line pig comprises a generally impermeable material.

* * * * *